US009927028B2

(12) United States Patent
Shin et al.

(10) Patent No.: US 9,927,028 B2
(45) Date of Patent: Mar. 27, 2018

(54) OPERATING APPARATUS FOR EMERGENCY RELEASE CABLE

(71) Applicant: Infac Corporation, Seoul (KR)

(72) Inventors: Young Kyu Shin, Gyeonggi-do (KR); Sung Joon Lee, Gyeonggi-do (KR)

(73) Assignee: INFAC Corporation, Seoul (KR)

( * ) Notice: Subject to any disclaimer, the term of this patent is extended or adjusted under 35 U.S.C. 154(b) by 161 days.

(21) Appl. No.: 14/979,901

(22) Filed: Dec. 28, 2015

(65) Prior Publication Data

US 2017/0175889 A1    Jun. 22, 2017

(30) Foreign Application Priority Data

Dec. 16, 2015   (KR) .......................... 10-2015-0179997

(51) Int. Cl.
| | |
|---|---|
| *F16H 63/34* | (2006.01) |
| *F16H 59/02* | (2006.01) |
| *F16H 61/36* | (2006.01) |
| *F16H 61/12* | (2010.01) |

(52) U.S. Cl.
CPC ..... *F16H 63/3491* (2013.01); *F16H 59/0278* (2013.01); *F16H 61/36* (2013.01); *F16H 2059/0282* (2013.01); *F16H 2061/126* (2013.01); *F16H 2061/1232* (2013.01)

(58) Field of Classification Search
CPC ......... F16H 59/0278; F16H 2059/0282; F16H 61/36; F16H 2061/1232; F16H 2061/126; F16H 63/3491
See application file for complete search history.

(56) References Cited

U.S. PATENT DOCUMENTS

| | | | | | |
|---|---|---|---|---|---|
| 5,489,246 | A | * | 2/1996 | Moody | .................. F16H 59/10 |
| | | | | | 192/220.2 |
| 6,481,556 | B1 | * | 11/2002 | Haupt | ................ F16H 63/3491 |
| | | | | | 188/31 |
| 7,334,497 | B2 | * | 2/2008 | Giefer | .................... F16H 59/10 |
| | | | | | 74/473.12 |
| 8,327,732 | B2 | * | 12/2012 | Giefer | .................... F16H 61/22 |
| | | | | | 74/473.23 |
| 9,080,663 | B2 | * | 7/2015 | Grosse Kohorst | .. F16H 59/0204 |
| 9,109,688 | B2 | * | 8/2015 | Beaufils | ................. B60T 7/102 |

(Continued)

FOREIGN PATENT DOCUMENTS

| | | |
|---|---|---|
| EP | 1464875 A2 | 10/2004 |
| KR | 20130081920 A | 7/2013 |

OTHER PUBLICATIONS

European Search Report from EP 15202818.9 issued by the EPO dated Jun. 21, 2017.

*Primary Examiner* — Adam D Rogers
(74) *Attorney, Agent, or Firm* — Harness, Dickey & Pierce, P.L.C.

(57) ABSTRACT

Disclosed herein is an operating apparatus for an emergency release cable, which is capable of significantly improving durability and reliability and increasing the convenience of a driver and a passenger by preventing a malfunction of an emergency release lever through a structure which prevents abrasion of a fixing structure of the emergency release lever connected to the emergency release cable and a structure which automatically switches a transmission to the parking position as the fixing structure of the emergency release lever is released when the engine and the transmission are restarted.

20 Claims, 17 Drawing Sheets

(56) References Cited

U.S. PATENT DOCUMENTS

| | | |
|---|---|---|
| 2004/0174567 A1 | 9/2004 | Abe et al. |
| 2005/0239596 A1 | 10/2005 | Glefer et al. |
| 2011/0137533 A1 | 6/2011 | Park |
| 2014/0305245 A1* | 10/2014 | Kim ........................ B60W 10/11 74/483 R |
| 2014/0326101 A1* | 11/2014 | Han ........................ B60T 7/102 74/502.2 |
| 2015/0298663 A1* | 10/2015 | Tashiro ............... F16H 63/3416 |
| 2017/0009800 A1* | 1/2017 | Lee ........................... F16C 1/14 |
| 2017/0138475 A1* | 5/2017 | Kim ................... F16H 63/3491 |

* cited by examiner

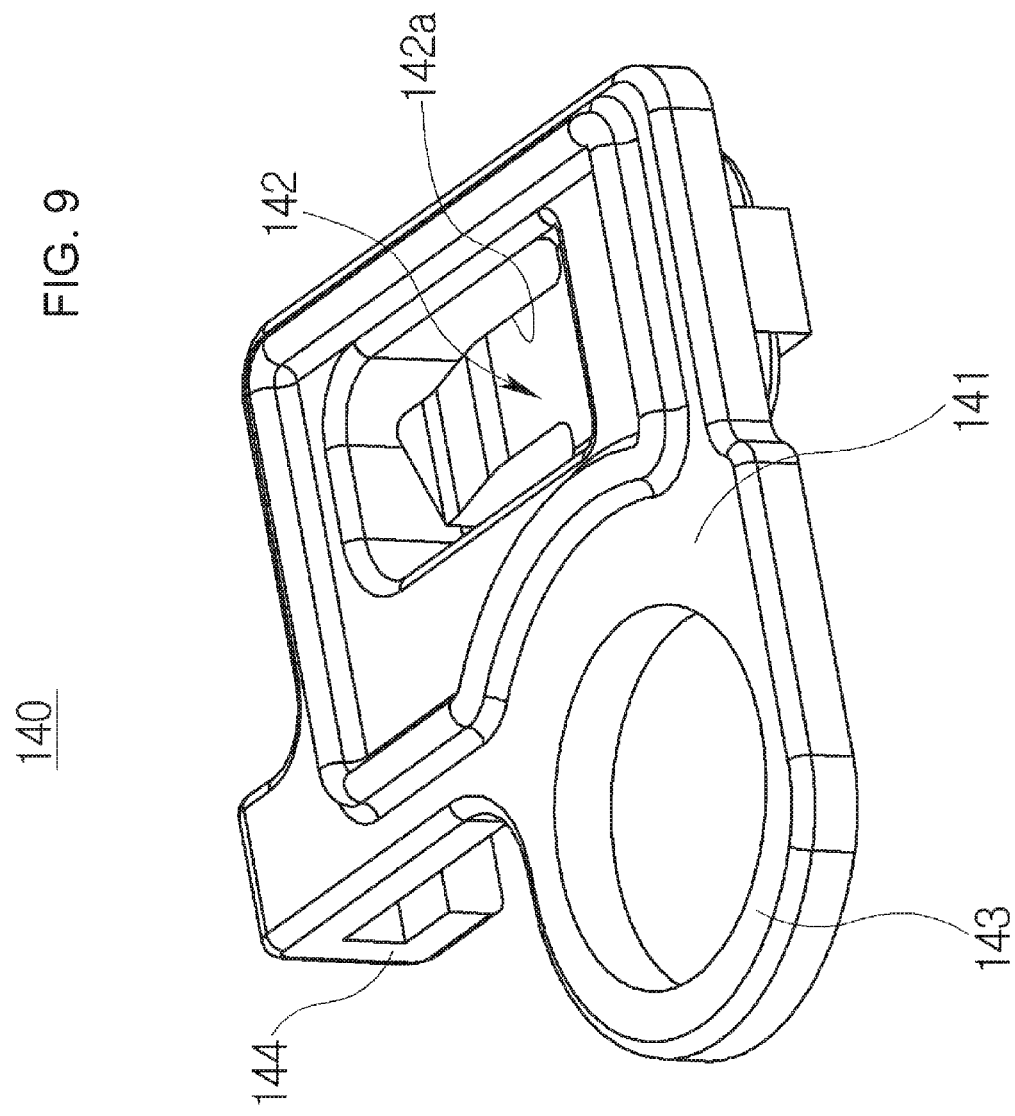

OPERATING APPARATUS FOR EMERGENCY RELEASE CABLE

CROSS-REFERENCE TO RELATED APPLICATIONS

This application claims priority to Korean Patent Application No. 10-2015-0179997, filed on Dec. 16, 2015, the disclosure of which is incorporated herein by reference in its entirety.

BACKGROUND OF THE INVENTION

Field of the Invention

Exemplary embodiments of the present invention relate to an operating apparatus for an emergency release cable, and more particularly, to an operating apparatus for an emergency release cable, which enables a user to manually switch an automatic transmission from the parking position to the neutral position, using the emergency release cable.

Description of the Related Art

Vehicles which are recently developed or mass-produced employ vehicle electronic control technology called 'drive by wire', in order to perform the optimized control for an operation situation after a driver's intention is inputted from various controllers.

Among the electronic control technologies, electronic shift control technology called 'shift by wire', which is mainly applied to automatic transmissions for luxury vehicles, has an electrical connection structure between an electronic shift lever and a transmission control unit (TCU), instead of a mechanical connection structure such as a cable or link which is positioned between a mechanical shift lever and a transmission.

The electronic shift control technology controls an actuator according to various algorithms of a controller, and performs various shifting control functions such as gear shifting and manual mode shifting.

The electronic shift control technology has various advantages in that the technology can offer simple and convenient operability to a driver and secure the flexibility of a packaging space, while being effectively used for anti-theft technologies in connection with an electronic key.

Vehicles to which the electronic shift control technology is applied must have a fail-safe function for an emergency such as a trouble of an electronic shift lever or electronic TCU or a communication fail between electronic units.

In connection with the control technology with a fail-safe function, Korean Patent Publication No. 10-2013-0062645 discloses a technology which determines whether a communication fail occurred between an electronic shift lever and a TCU, and automatically shifts an electronic shift lever to the neutral position during an emergency such as a communication fail.

The technology disclosed in this patent document cannot be applied when a fail occurs in the TCU itself.

Korean Patent No. 10-1104043 discloses a technology which pulls an override cable using an actuator installed at an electronic shift lever and forces a parking sprag to be separated from a parking gear, when a fail occurs in a TCU or electronic shift lever, thereby performing a fail-safe function for a TCU fail.

In the technology disclosed in this patent document, the actuator installed at the electronic shift lever is electrically connected to the electronic shift lever and electrically operated. Thus, the actuator cannot be applied when a fail occurs in the electronic shift lever itself.

In order to solve the problem of the electronic fail-safe structure, a variety of technologies have been developed, which are manually operated only by a driver or passenger's intention, switches a transmission to the neutral position from the parking position by pulling a cable connected to the transmission using a mechanical actuator, and maintains the switched state. Hereafter, the cable is referred to as an emergency release cable.

An operating apparatus for the emergency release cable using the mechanical actuator has a configuration in which the emergency release cable connected to a lever is pulled when a user operates the lever and the lever is fixed through a hook structure to maintain the state of the emergency release cable.

In the case of the configuration that fixes the lever through the hook structure, the fixing structure between the hook and the hook counterpart may be worn down or damaged as the hook and the hook counterpart are relatively coupled and released. Then, the fixing structure may loosen or cannot fix the hook and the hook counter park. In this case, a serious problem is likely to occur.

Furthermore, in the case of the mechanical actuator having a structure that is fixed through the hook structure, a user must manually return a lever to restart the vehicle, when the engine and the transmission are restarted after a fail of electronic equipment is solved, which may make the user experience inconvenience.

PRIOR ART DOCUMENT

[Patent Document]
(Patent Document 001) Korean Patent Laid-open Publication No. 10-2013-0062645
(Patent Document 002) Korean Patent No. 10-1104043

SUMMARY OF THE INVENTION

The present invention has been made in view of the above problems, and it is an object of the present invention to provide an operating apparatus for an emergency release cable, which prevents abrasion of a fixing structure of an emergency release lever connected to the emergency release cable, and prevents malfunctions in the related arts, thereby improving the durability and reliability.

Furthermore, it is another object of the present invention to provide an operating apparatus for an emergency release cable, which switches a transmission to the parking position while a fixing structure of an emergency release lever is automatically released when an engine and a transmission are restarted after a fail of electronic equipment is recovered, thereby improving the convenience of a driver and a passenger.

Other objects and advantages of the present invention can be understood by the following description, and become apparent with reference to the embodiments of the present invention. Also, it is obvious to those skilled in the art to which the present invention pertains that the objects and advantages of the present invention can be realized by the means as claimed and combinations thereof.

In accordance with one aspect of the present invention, there is provided an operating apparatus for an emergency release cable, which enables a user to manually switch an automatic transmission from a parking position to a neutral position using the emergency release cable. The operating apparatus may include: a lever bracket fixed to a position adjacent to a driver's seat; a handle lever installed in the lever bracket so as to pivot around a pivot axis from a first position to a second position, and fixing an end of the emergency release cable; a slider having a lock protrusion for fixing the handle lever to the second position, and linearly-movably coupled to the handle lever; a spring finger fixed to the lever bracket, and engaged with the lock protrusion so as to block the handle lever from returning to the first position from the second position; and a guide pin preventing the handle lever from being separated from the lever bracket, and pivotably supporting the handle lever. When the handle lever is pivoted from the first position to the second position, the emergency release cable may be pulled to switch the automatic transmission from the parking position to the neutral position. When the handle lever is pivoted to the second position, the lock protrusion and the finger part may be engaged to fix the handle lever to the second position. When a tension exceeding a predetermined magnitude is applied to the emergency release cable after the handle lever is fixed to the second position, the engagement between the lock protrusion and the finger part may be released while the slider is linearly moved in a direction away from the pivot axis.

The slider may include: a flat body part having one surface contacted with the handle lever; a first hook part protruding from the upper end part of the other surface of the flat body part; and a second hook part protruding from the lower end part of the other surface of the flat body part, and the lock protrusion protrudes from the other surface of the flat body part, and is formed between the first and second hook parts.

The lock protrusion may include: an inclined surface coming in contact with the spring finger, when the handle lever is pivoted from the first position to the second position; and a vertical surface engaged with the spring finger when the handle lever is completely pivoted, and blocking the handle lever from returning from the second position to the first position.

A virtual straight extension line formed when the vertical surface crosses a plane perpendicular to the pivot axis may be spaced at a predetermined distance from the pivot axis.

The handle lever may include: a lever body having a pivot hole through which the guide pin is passed and a guide groove part formed on one surface thereof, the guide groove part guiding the linear reciprocation of the slider; a first guide wall spaced at a distance from the bottom surface of the guide groove part, the distance corresponding to the thickness of the upper end part of the flat body part, and having a first guide hole into which the first hook part is inserted; and a second guide wall spaced at a distance from the bottom surface of the guide groove part, the distance corresponding to the thickness of the lower end part of the flat body part, and having a second guide hole into which the second hook part is inserted, and the linear reciprocation of the slider is guided through the movement of the first hook part in the first guide hole and the movement of the second hook part in the second guide hole.

The slider may have one or more ribs formed on the one surface thereof, the one or more ribs coming in contact with the bottom surface of the guide groove part.

The slider may further include a third hook part preventing the movement of the slider so as to maintain the engagement between the lock protrusion and the spring finger, and the handle lever may further include a lock hole into which the third hook part is inserted and fixed.

The third hook part may be formed at a position adjacent to the second hook part, and the lock hole may be integrated with the second guide hole.

The third hook part may have a third stopper surface which is inserted into the lock hole to block the movement of the slider, and the third stopper surface may have an inclination angle which increases in a direction away from the lock hole.

When a tension exceeding a predetermined magnitude is applied to the emergency release cable, the third hook part may be separated from the lock hole, and the engagement between the lock protrusion and the spring finger may be released.

The bottom surface of the guide groove part may have a coupling groove formed at a position corresponding to the first hook part, and the coupling groove may be formed along the direction of the linear reciprocation of the slider.

The lever body of the handle lever may have a manual release groove which communicates with the guide groove part, in order to manually release the engagement between the lock protrusion and the spring finger.

The lever bracket may include: a bracket body having a fastening hole through which a fastening unit is passed; a first sidewall extended from the bracket body, and having a first through-hole through which the guide pin is passed; and a second sidewall extended from the bracket body in a direction parallel to the first sidewall, and having a second through-hole through which the guide pin is passed, and the handle lever is housed to pivot from the first position to the second position in a housing space between the first and second sidewalls in a state where the handle lever and the slider are coupled to each other.

At least one of the first and second sidewalls may have a pressurizing protrusion which protrudes toward the housing space, and collides with the slider when the handle lever is pivoted from the second position to the first position.

The spring finger may be integrated with the lever bracket.

The spring finger may be formed separately from the lever bracket, and coupled and fixed to the lever bracket.

The spring finger may include: a plate-shaped member having a fixing hole through which the guide pin is passed, and attached and fixed to the outer surface of any one of the first and second sidewalls; and a hook-shaped finger part including a support rod of which one end serves as a fixed end connected to the plate-shaped member and the other end serves as a free end, and a stopper protrusion which protrudes from the other end of the support rod toward the housing space.

The spring finger may further include a fastening leg which is integrated with the plate-shaped member so as to be fastened to the outer surface of any one of the first and second sidewalls.

The outer surface of any one of the first and second sidewalls may have a finger guide groove corresponding to the shape of the plate-shaped member, and the finger guide groove may have a finger hole through which the stopper protrusion is passed.

The operating apparatus may further include a protection ring formed of a metallic material and inserted and fixed to the fastening hole.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 9 is a front perspective view of a spring finger illustrated in FIG. 2;

DESCRIPTION OF SPECIFIC EMBODIMENTS

Figure 1:
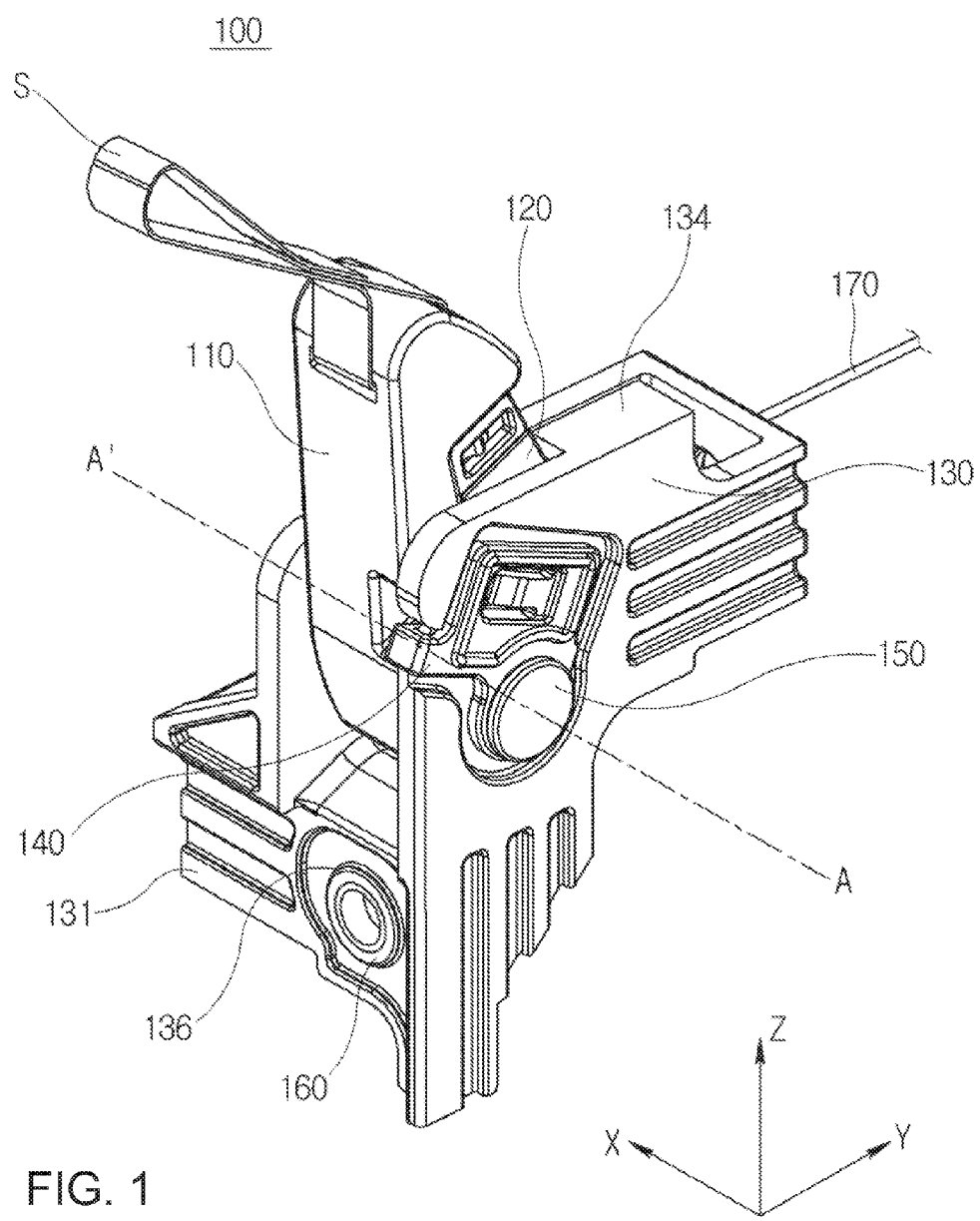
FIG. 1 is a perspective view of an operating apparatus for an emergency release cable according to an embodiment of the present invention.

Hereafter, an operating apparatus for an emergency release cable according to an embodiment of the present invention will be described with reference to the accompanying drawings.

The present invention may be modified in various manners and have a variety of embodiments. Thus, specific embodiments are illustrated in the drawings, and will be described in detail in the description of specific embodiments. However, the present invention is not limited to specific embodiments, and may include all of variations, equivalents, and substitutes within the scope of the present invention.

In the following descriptions, terms such as first and second may be used to describe various components, but the components are not limited by the terms. The terms are used only to distinguish one component from another component. For example, a first element may be referred to as a second element, and the second element may be referred to as the first element, without departing from the spirit and scope of the invention as defined in the following claims.

The term such as and/or may include a combination of a plurality of related components or any one of the related components.

When an element is referred to as being "connected" or "coupled" to another element, it should be understood that the former can be directly connected or coupled to the latter, or connected or coupled to the latter via an intervening element therebetween. On the other hand, when an element is referred to as being "directly connected" to another element, it should be understood that no element exists therebetween.

The terms used in this specification are used only to describe specific embodiments, and not intended to limit the present invention. The terms of a singular form may include plural forms unless referred to the contrary.

In this application, the term such as "include" or "have" specifies a property, a number, a step, an operation, a component, a part, or a combination thereof which is described in the specification, but does not exclude one or more other properties, numbers, steps, operations, components, parts or combinations thereof.

The terms including technical or scientific terms have the same meanings as the terms which are generally understood by those skilled in the art to which the present invention pertains, as long as they are differently defined. The terms defined in a generally used dictionary may be analyzed to have meanings which coincide with contextual meanings in the related art. As long as the terms are not clearly defined in this specification, the terms may not be analyzed as ideal or excessively formal meanings.

Furthermore, the following embodiments are provided for understanding of those skilled in the art, and the shapes and sizes of elements in the drawings are exaggerated for clarity of description.

Figure 2:
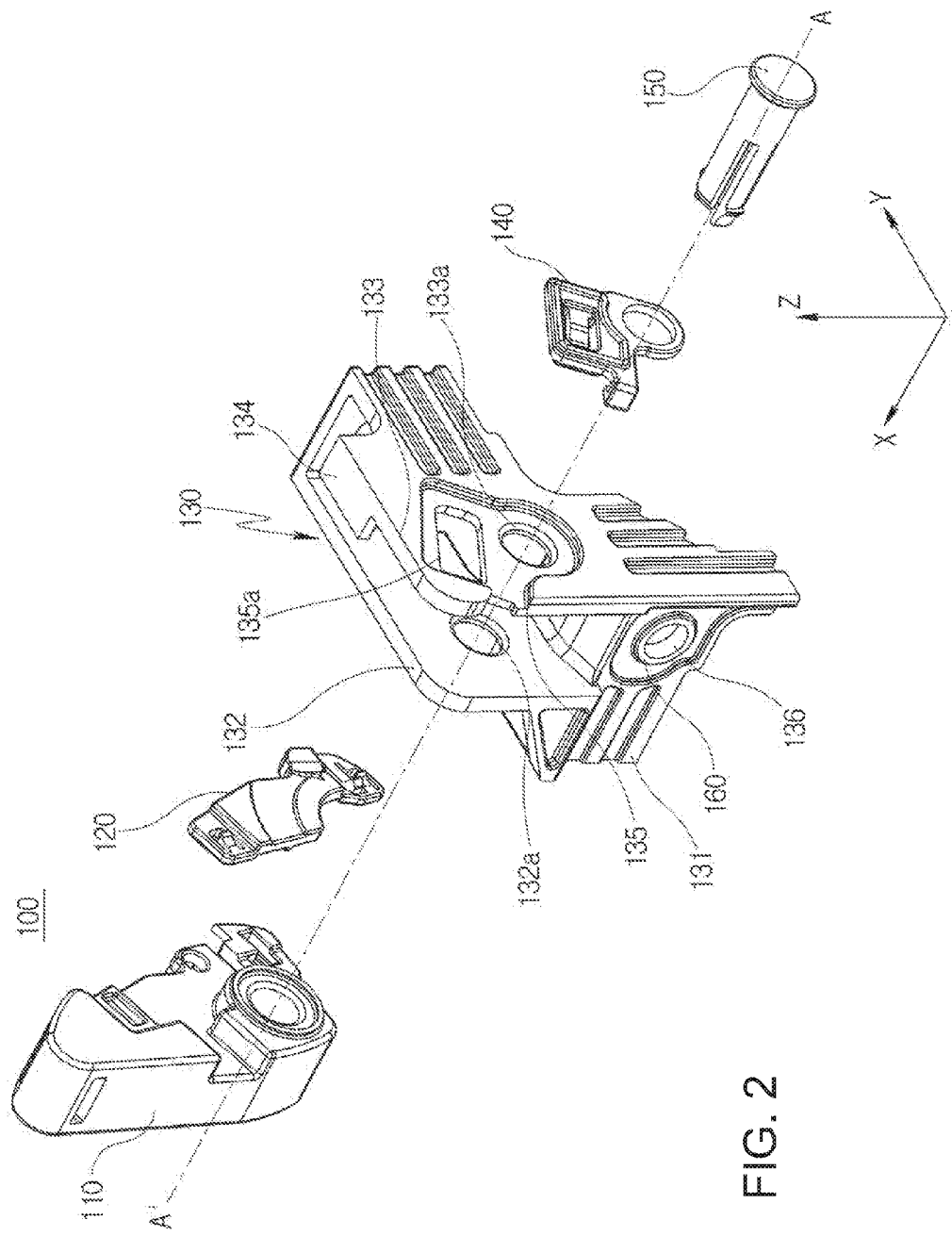
FIG. 2 is an exploded perspective view of FIG. 1.

FIG. 1 is a perspective view of an operating apparatus 100 for an emergency release cable according to an embodiment of the present invention. FIG. 2 is an exploded perspective view of FIG. 1.

Referring to FIGS. 1 and 2, the operating apparatus 100 for an emergency release cable according to the embodiment of the present invention includes a lever bracket 130, a handle lever 110, a slider 120, a spring finger 140, and a guide pin 150. The lever bracket 130 is fixed to a position adjacent to a driver's seat. The handle lever 110 is pivotably installed in the lever bracket 130 and fixes one end of the emergency release cable 170. The slider 120 is movably coupled to the handle lever 110. The spring finger 140 blocks the pivoted handle lever 110 from returning to the original position. The guide pin 150 prevents the handle lever 110 from being separated from the lever bracket 130, and pivotably supports the handle lever 110.

The lever bracket 130 is fixed at a position adjacent to the driver's seat, or desirably in a console box (not illustrated) which can be easily accessed by a driver or passenger, while being hidden at normal times. The lever bracket 130 serves to pivotably support the handle lever 110 which will be described below.

More specifically, as illustrated in FIG. 2, the lever bracket 130 according to the embodiment of the present invention includes a bracket body 131, a first sidewall 132, and a second sidewall 133. The bracket body 131 has a fastening hole 136 through which a fastening unit (not illustrated) is passed. The first sidewall 132 is extended upward (Z-axis direction of FIG. 2) from the bracket body 131, and has a first through-hole 132a through which a guide pin 150 is passed. The second sidewall 133 is extended in the direction parallel to the first sidewall 132 from the bracket body 131, and has a second through-hole 133a through which the guide pin 150 is passed.

The bracket body 131 forms the body of the operating apparatus 100 for an emergency release cable according to the embodiment of the present invention, and supports the components of the operating apparatus 100. The bracket body 131 is fixed in the vehicle body of the vehicle, for example, the console box through a fastening unit (not illustrated), and has the fastening hole 136 formed at the bottom thereof such that a fastening unit such as a bolt can be passed through the fastening hole 136. The material of the bracket body 131 is not limited, but a synthetic polymer material having a predetermined strength may be used in consideration of weight.

The first and second sidewalls 132 and 133 have the first and second through-holes 132a and 133a, respectively, through which the guide pin 150 can be passed at the same time, and form a housing space for housing the handle lever 110 which reliably support the guide pin 150 and pivots from a first position P1 to a second position P2.

Both side surfaces and the front surface of the housing space are blocked by the first and second sidewalls 132 and 133, and the rear and top surfaces of the housing space are opened, the rear and top surfaces being adjacent to the first and second through-holes 132a and 133a forming a pivot axis A-A' of the handle lever 110. Thus, as described below, the handle lever 110 is supported in the housing space so as to pivot within the angle range between the first and second positions P1 and P2.

The bottom surface of the housing pace is partially opened to connect the emergency release cable 170 of FIG. 1 to the handle lever 110.

The first and second sidewalls 132 and 133 may be separately manufactured and attached to the bracket body 131. As illustrated in FIG. 2, however, the first and second sidewalls 132 and 133 and the bracket body 131 may be manufactured as one unit.

The present invention is not limited thereto, but the following descriptions will be focused on the embodiment in which the first and second sidewalls 132 and 133 are integrated with the bracket body 131.

As illustrated in FIG. 2, the bracket body 131 includes a protection ring 160 which is inserted and fixed to the inner surface of the fastening hole 136. The protection ring 160 formed of a metallic material serves to prevent the fastened part from being damaged by excessive torque, when the bracket body 131 is fixed to the vehicle body through a fastening unit such as a bolt.

During an emergency, a driver or passenger pivots the lever 110 from the first position P1 to the second position P2 to pull one end of the emergency release cable 170. Then, the automatic transmission of the vehicle, connected to the other end of the emergency release cable 170, is switched from the parking position to the neutral position.

Figure 3:
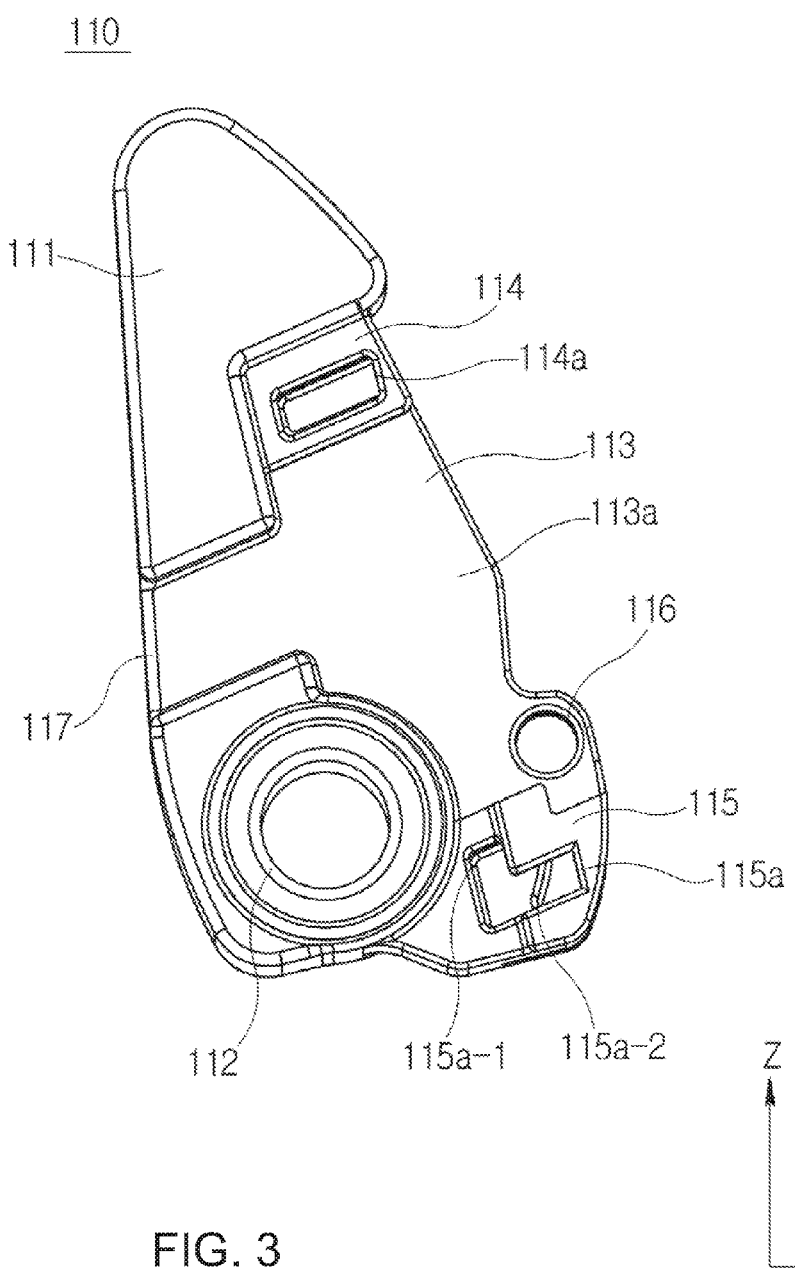
FIG. 3 is a front view of a handle lever illustrated in FIG. 2.
Figure 4:
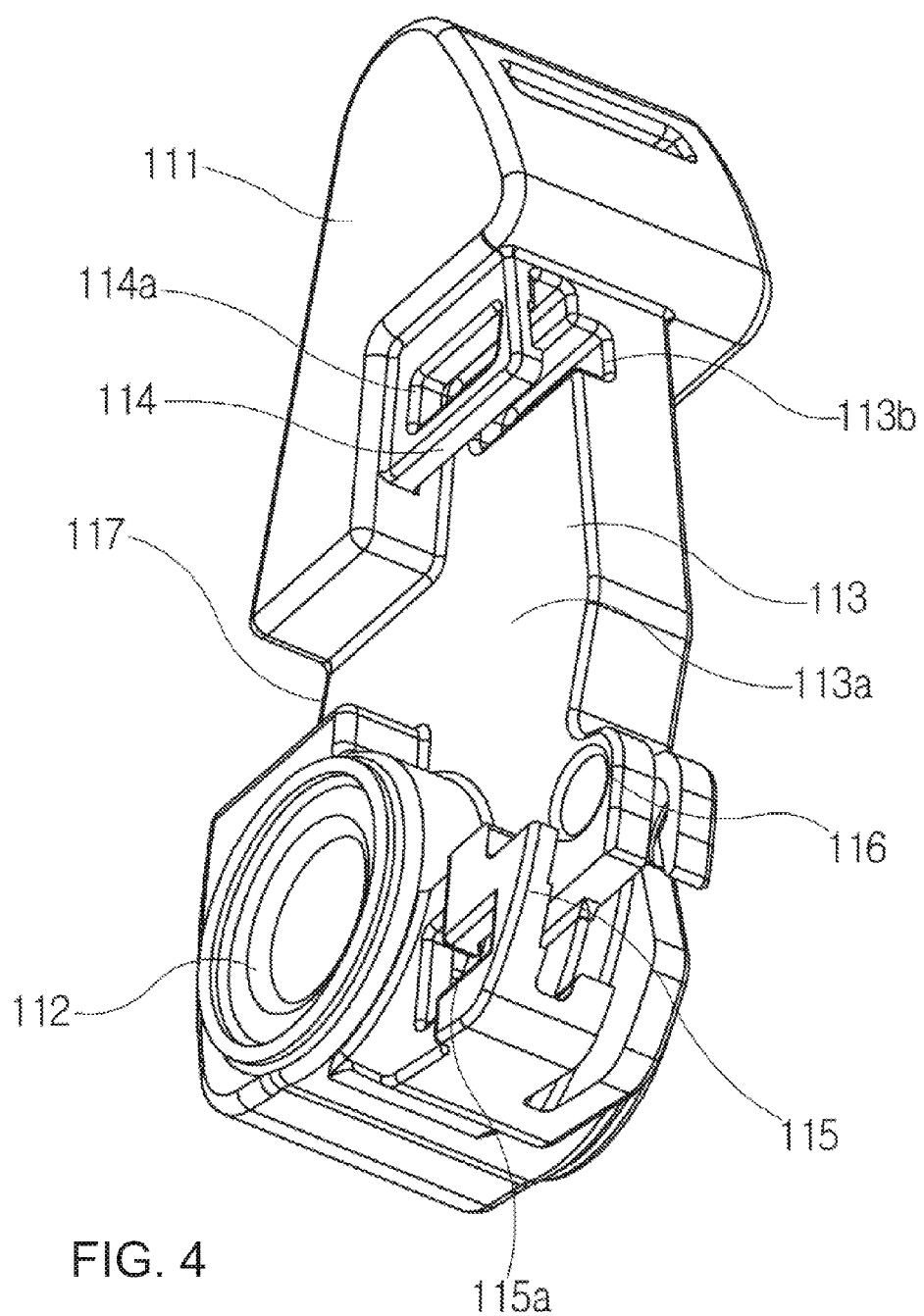
FIG. 4 is a perspective view of FIG. 3.

More specifically, as illustrated in FIGS. 3 and 4, the handle lever 110 in accordance with the embodiment of the present invention includes a lever body 111 and first and second guide walls 114 and 115. The lever body 111 has a pivot hole 112 through which the guide pin 150 is passed, and the first and second guide walls 114 and 115 are spaced from one side surface of the lever body 111.

The lever body 111 forms the body of the handle lever 110 and has a bar shape of which the length is larger than the width thereof. The upper end part of the lever body 111 based on FIG. 3 serves as a handle which can be operated by a driver or passenger in person, or is connected to another unit such as a strap S of FIG. 1, and pivoted through the strap S by a user.

The lower end part of the lever body 111 has a pivot hole 112 into which the guide pin 150 forming the pivot axis A-A' for a pivot operation is inserted. The pivot operation from the first position P1 to the second position P2 and the pivot operation in the opposite direction can be performed through the guide pin 150, and a cable connection part 116 to which one end of the emergency release cable 170 is fixed is formed at a position adjacent to the pivot hole 112.

Thus, the pivot operation of the lever body 111 in a first direction, that is, the pivot operation from the first position P1 to the second position P2 applies a tension in a direction to pull the emergency release cable 170 through the cable connection part 116. Conversely, when a tension is applied to the emergency release cable 170 through the automatic transmission during a restart of the engine and the automatic transmission, the lever body 111 receives a force applied in a second direction reverse to the first direction, through the cable connection part 116. That is, the force returns the lever body 111 to the first position P1 from the second position P2.

The lever body 111 has a guide groove part 113 formed at one side surface (front side of FIG. 3) thereof. The guide groove part 113 forms a space in which the slider 120 to be described below is seated, and guides the linear reciprocation of the slider 120.

The first and second guide walls 114 and 115 not only guide a relative movement of the slider 120 which is linearly reciprocated in the guide groove part 113 of the lever body 111, but also prevent the slider 120 from being separated from the lever body 111.

Specifically, as illustrated in FIG. 4, the first guide wall 114 is formed at a position adjacent to the top of the handle lever 110 so as to be spaced at a distance corresponding to the thickness of the upper end part of the slider 120 from the bottom surface 113a of the guide groove part 113, and has a first guide hole 114a into which a first hook part 122 of the slider 120 is inserted.

The second guide wall 115 is formed at a position adjacent to the bottom of the handle lever 110, that is, a position adjacent to the pivot hole 112 of the handle lever 110 so as to be spaced at a distance corresponding to the thickness of the lower end part of a flat body part 121 from the bottom surface 113a of the guide groove part 113, and has a second guide hole 115a into which a second hook part 123 of the slider 120 is inserted.

In this case, the first and second guide holes 114a and 115a are formed in a rectangular shape of which the horizontal width is larger than the vertical width, in order to guide the linear motion of the slider 120.

As described below, one side surface of the slider 120 is in contact with the bottom surface 113a of the guide groove part 113 of the handle lever 110, the other side surface of the slider 120 is in contact with the inner surfaces of the first and second guide walls 114 and 115, and the handle lever 110 and the slider 120 are assembled in a state where the first hook part 122 of the slider 120 is inserted into the first guide hole 114a and the second hook part 123 is inserted into the second guide hole 115a.

The above-described structure can prevent the slider 120 from being separated from the handle lever 110, while the linear reciprocation (Y-direction of FIG. 3) of the slider 120 is guided by the linear motion of the first hook part 122 of the slider 120 in the side-to-side direction in the first guide hole 114a and the motion of the second hook part 123 of the slider 120 in the side-to-side direction of the second guide hole 115a.

When the slider 120 is assembled to the handle lever 110, the first and second hook parts 122 and 123 are locked to the first and second guide walls 114 and 115 and deformed toward the bottom surface 113a of the guide groove part 113. In order to increase the assembling property of the slider 120 against the deformation, the bottom surface 113a of the guide groove part 113 has a coupling groove 113b through which the slider 120

Furthermore, one or more of the first and second guide walls 114 and 115 may have a lock hole 115a-1 to which a third hook part 124 of the slider 120 is inserted and fixed.

The present invention is not limited thereto, but FIGS. 3 and 4 illustrate an embodiment in which the lock hole 115a-1 is integrated with the second guide hole 115a of the second guide wall 115. As such, the second guide hole 115a may be divided into upper and lower holes 115a-1 and 115a-2. The lower hole 115a-2 serves to guide the motion of the second hook part 123 of the slider 120, and the third hook part 124 of the slider 120 is inserted and fixed to the upper hole.

The guide pin 150 prevents the handle lever 110 from being separated from the lever bracket 130, pivotably supports the handle lever 110, and is passed through the first and second through-holes 132a and 133a of the lever bracket 130 and the pivot hole 112 of the handle lever 110 at the same time.

As illustrated in FIG. 2, the guide pin 150 may have a flange-shaped stopper formed at one end thereof and a plurality of separation prevention hooks formed at the other end thereof. The stopper and the plurality of separation prevention hooks serve to prevent the guide pin 150 from being separated from the first and second through-holes 132a and 133a, after the guide pin 150 is coupled to the first and second through-holes 132a and 133a.

The slider 120 is movably coupled to the handle lever 110 by the first and second guide walls 114 and 115, and serves to fix the handle lever 110 to the second position P2, in order to maintain the automatic transmission at the neutral position.

Figure 5:
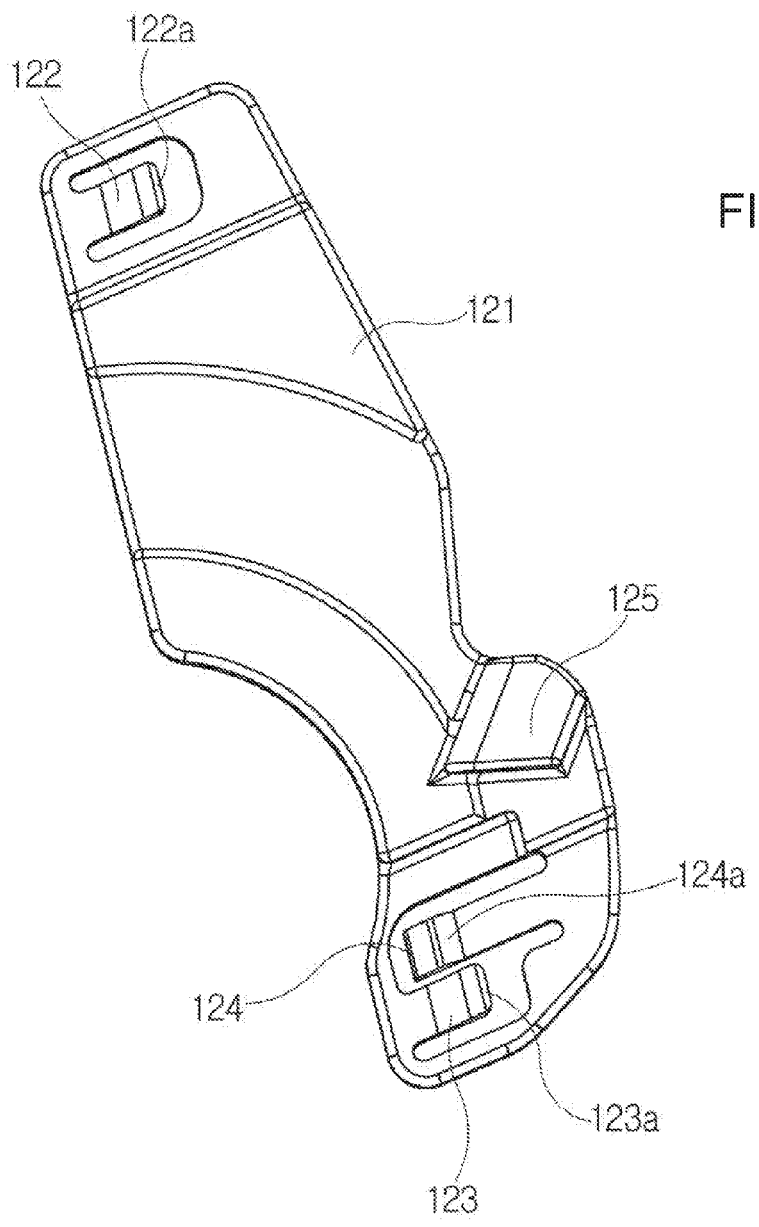
FIG. 5 is a front view of a slider illustrated in FIG. 2.
Figure 6:
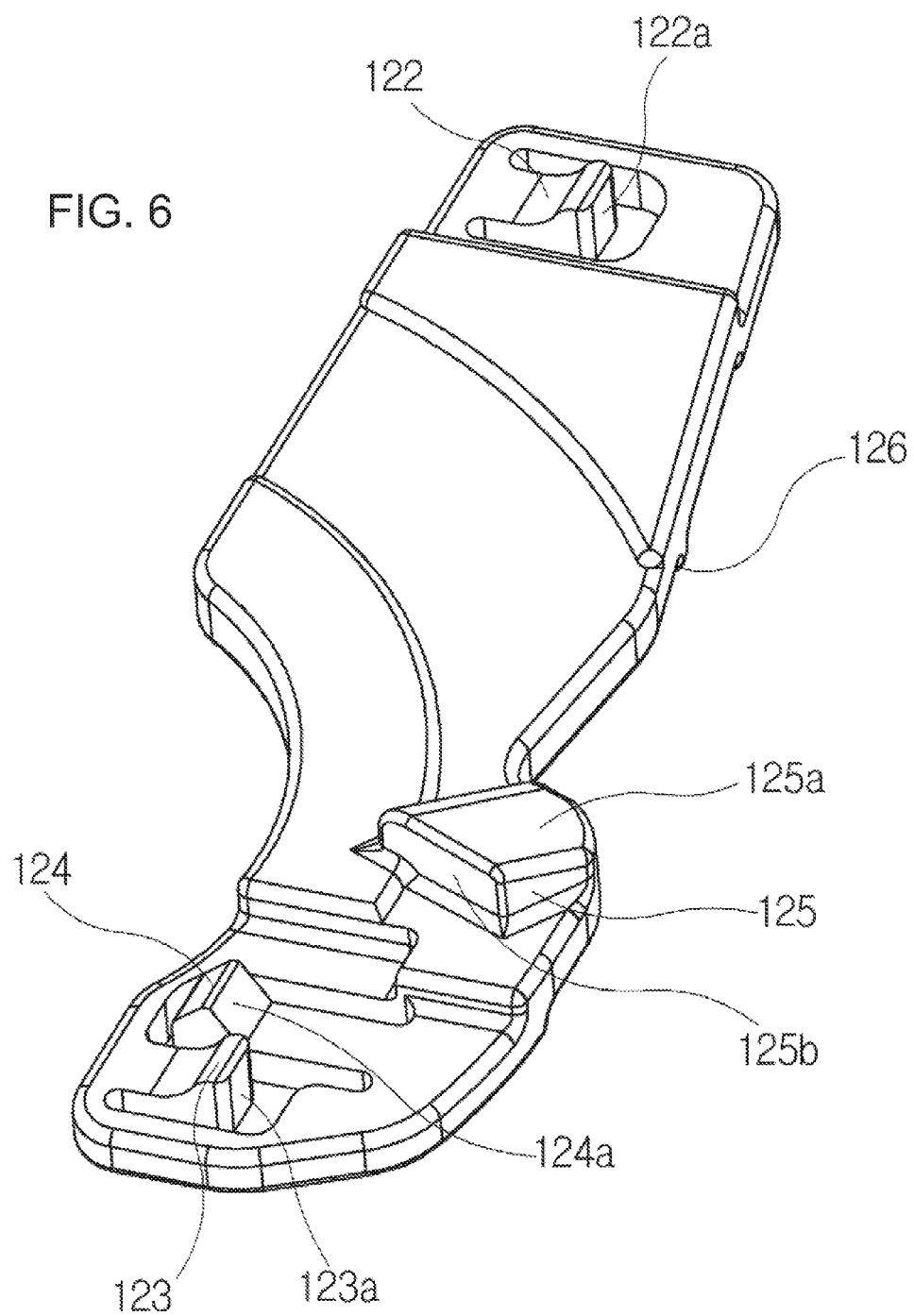
FIG. 6 is a perspective view of FIG. 5.

More specifically, as illustrated in FIGS. 5 and 6, the slider 120 includes the flat body part 121, the first hook part 122, the second hook part 123, and a lock protrusion 125. The flat body part 121 has one side surface contacted with the handle lever 110. The first hook part 122 is formed to protrude from the upper end part of the other side surface of the flat body part 121. The second hook part 123 is formed to protrude from the lower end part of the other surface of the flat body part 121. The lock protrusion 125 is engaged with a finger part 142 of a spring finger 140 for fixing the handle lever 110. The spring finger 140 will be described below.

The flat body part 121 is inserted into the guide groove part 113 such that the one side surface thereof is in contact with the bottom surface 113a of the guide groove part 113 of the handle lever 110, and the upper and lower end parts of the other surface of the flat body part 121 have a uniform thickness so as to be inserted into the first and second guide walls 114 and 115 of the handle lever 110.

As illustrated in FIGS. 5 and 6, the first and second hook parts 122 and 123 are formed in the upper and lower end parts of the flat body part 121, and inserted into the first guide hole 114a of the first guide wall 114 and the second guide hole 115a of the second guide wall 115, respectively. The motion of the slider 120 is performed through the interaction between the first hook part 122 and the first guide hole 114a and the interaction between the second hook part 123 and the second guide hole 115a.

The first and second hook parts 122 and 123 are formed in a hook shape which is easily inserted into the first and second guide holes 114a and 115a but not easily separated from the first and second guide holes 114a and 115a. The first hook part 122 has a first stopper surface 122a colliding with the first guide hole 114a when the slider 120 is moved, and the second hook part 123 has a second stopper surface 123a colliding with the second guide hole 115a when the slider 120 is moved. The first and second stopper surfaces 122a and 123a may be formed perpendicular to the moving direction of the slider 120.

The lock protrusion 125 protrudes from the other side surface of the flat body part 121, and is formed between the first and second hook parts 122 and 123. The lock protrusion 125 serves to fix the handle lever 110 to the second position P2 through an interaction with the finger part 142 of the spring finger 140 which will be described below.

The lock protrusion 125 includes an inclined surface 125a and a vertical surface 125b. The inclined surface 125a comes in contact with the spring finger 140 when the handle lever 110 is pivoted from the first position P1 to the second position P2, and serves as a surface over which the finger part 142 slides while the handle lever 110 is pivoted from the first position P1 to the second position P2. The vertical surface 125b is engaged with the spring finger 140 when the handle lever 110 is completely pivoted, and blocks the handle lever 110 from returning from the second position P2 to the first position P1.

As described below, the vertical surface 125b is formed in such a manner that a virtual straight extension line L formed when the vertical surface 125b crosses a plane perpendicular to the pivot axis A-A' is spaced at a predetermined distance d from the pivot axis A-A' of the handle lever 110. The vertical surface 125b will be described in detail with reference to FIG. 8.

As described above, the slider 120 includes the third hook part 124 which prevents a relative motion of the slider 120 in order to maintain the engagement between the lock protrusion 125 and the spring finger 140. FIGS. 5 and 6 illustrate that the third hook part 124 is formed at a position adjacent to the second hook part 123. However, the present invention is not limited thereto, but the position of the third hook part 124 may be changed according to the position of the lock hole 115a-1 formed in the handle lever 110. Such a modification pertains to the scope of the present invention.

However, when the engine and the automatic transmission are restarted to apply a tension exceeding a predetermined magnitude to the emergency release cable 170 after the handle lever 110 is fixed to the second position P2, the state of the slider 120 fixed to the handle lever 110 is released to automatically switch the automatic transmission from the neutral position to the parking position.

In order to easily release the state of the slider 120 fixed to the handle lever 110, the third stopper surface 124a of the third hook part 124 locked to the lock hole 115a-1 is formed with an inclined surface with respect to the moving direction of the slider 120, instead of a vertical surface.

That is, illustrated in the drawings, the inclined surface 125a has an inclination angle which increases with respect to the moving direction of the slider 120 in a direction away from the lock hole 115a-1. When the third stopper surface 124a is formed with a vertical surface, the third hook part 124 can be momentarily separated from the lock hole 115a-1, compared to the first and second stopper surfaces 122a and 123a.

The bottom surface 113a of the guide groove part 113 of the lever body 111 of the handle lever 110 is in contact with one surface of the flat body part 121 of the slider 120. Thus, when the slider 120 is linearly reciprocated, friction may occur between the bottom surface 113a and one surface of the slider 120, thereby interfering with the motion of the slider 120.

For this reason, the slider 120 has one or more ribs 126 formed on the one surface thereof. The one or more ribs 126 are in contact with the bottom surface 113a of the guide groove part 113, and extended in parallel to the moving direction of the slider 120. The one or more ribs 126 can reduce the contact area between the slider 120 and the lever body 111 of the handle lever 110, while reducing the frication therebetween.

Figure 7:
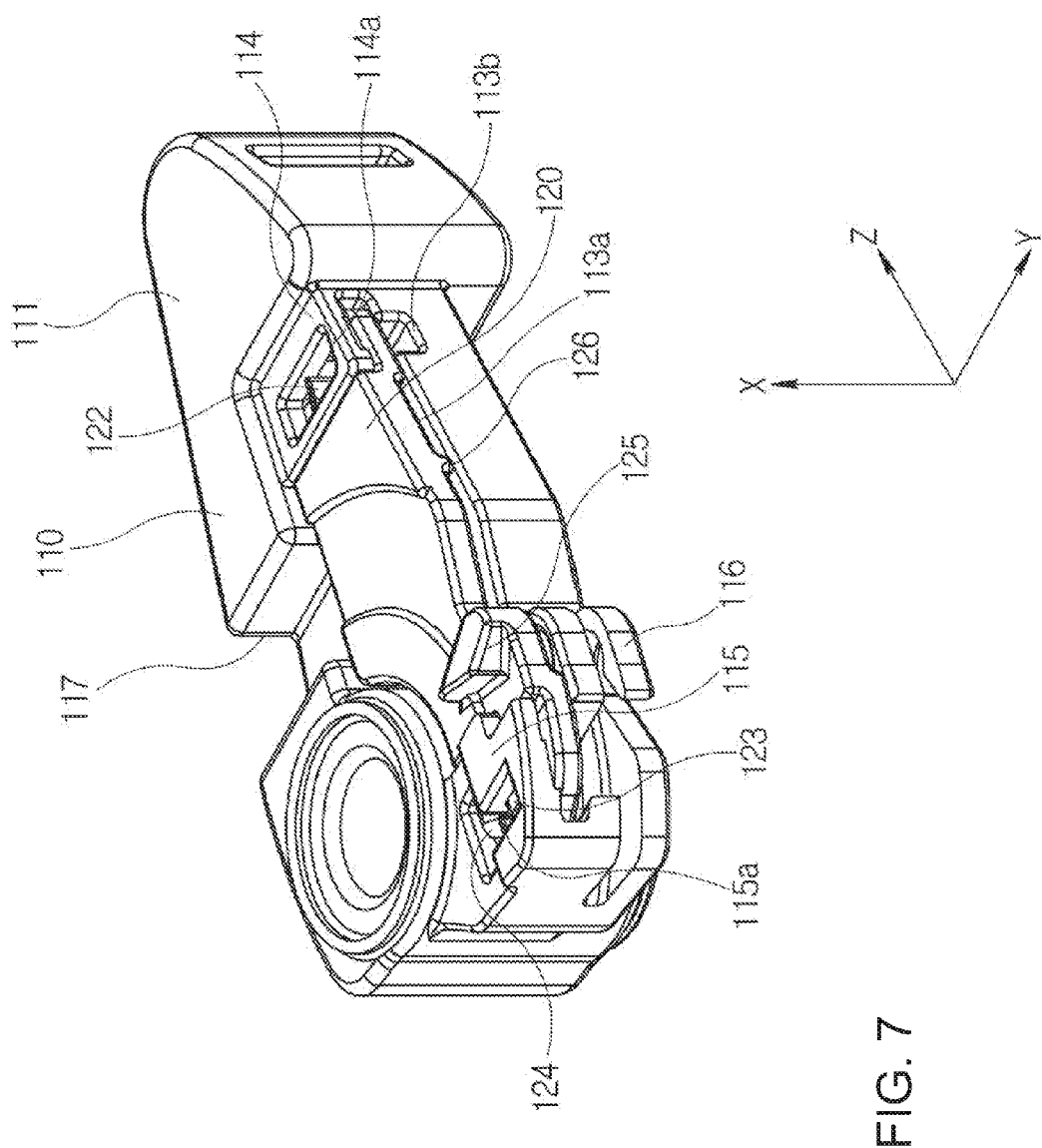
FIG. 7 is a perspective view illustrating a state in which the handle lever and the slider of FIG. 2 are coupled to each other.
Figure 8A:
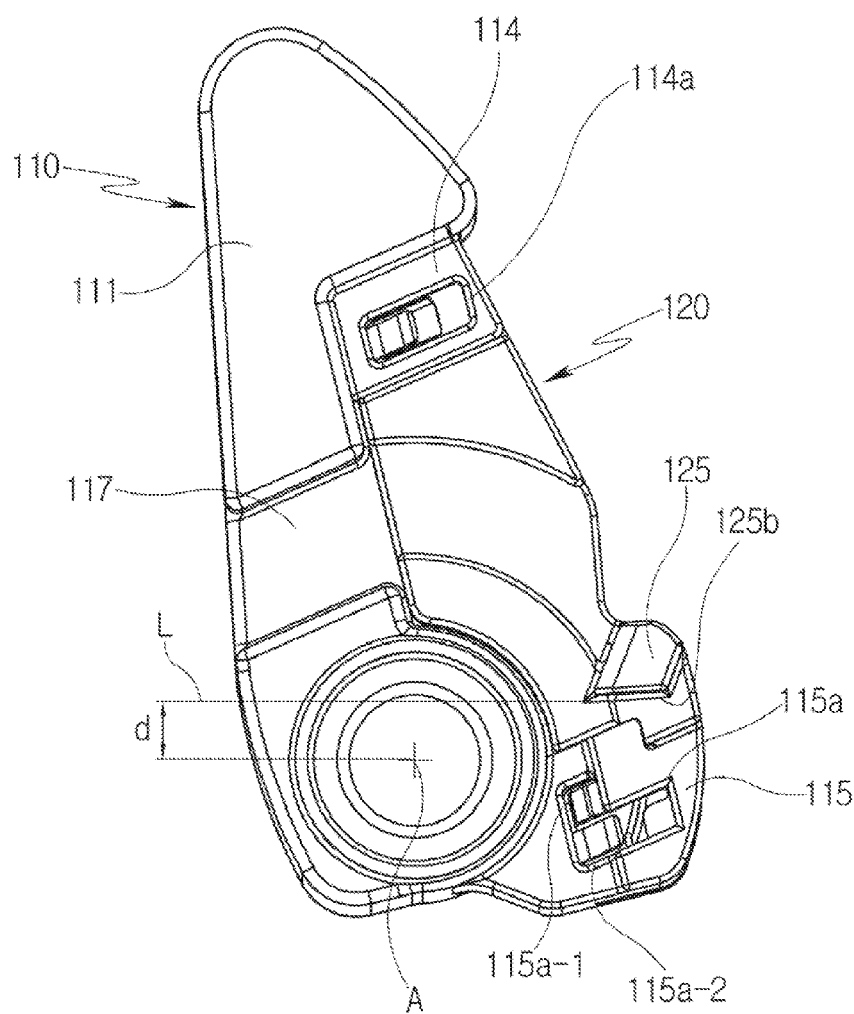
FIGS. 8A and 8B are front and enlarged views of FIG. 7.
Figure 8B:
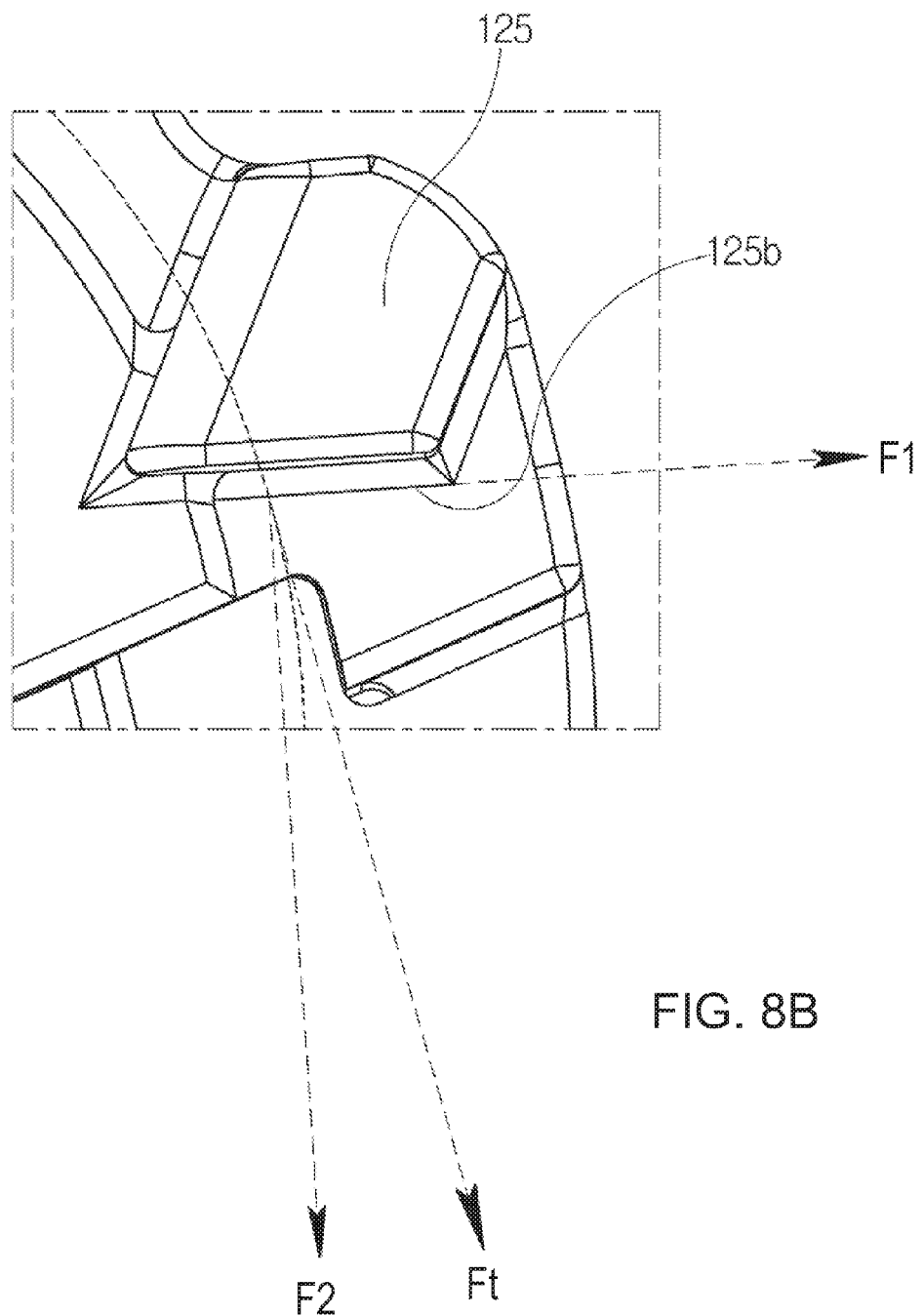

FIGS. 7 and 8 illustrate a state in which the slider 120 is coupled to the handle lever 110.

Referring to FIGS. 7 and 8, the upper end part of the flat body part 121 of the slider 120 is inserted into the first guide wall 114, and the lower end part of the flat body part 121 of the slider 120 is inserted into the second guide wall 115. While the slider 120 is coupled to the handle lever 110, the first hook part 122 of the slider 120 is inserted into the first guide hole 114a of the first guide wall 114, and the second hook part 123 is inserted into the second guide hole 115a of the second guide wall 115.

Then, when the slider 120 and the handle lever 110 are completely coupled to each other, the third hook part 124 of the slider 120 is fastened to the lock hole 115a-1, and the slider 120 is fixed to the handle lever 110. In this state, the slider 120 cannot relatively move for itself.

When the slider 120 is fixed to the handle lever 110 as illustrated in FIG. 8A, the lock protrusion 125 of the slider 120 is the closest to the pivot axis A-A' of the handle lever 110. In this state, when the handle lever 110 is pivoted fro the first position P1 to the second position P2, the lock protrusion 125 of the slider 120 is engaged with the finger part 142 of the spring finger 140.

As described above, however, the virtual straight extension line L formed when the vertical surface 125b of the lock protrusion 125 crosses the plane perpendicular to the pivot axis A-A' of the handle lever 110 is spaced at a predetermined distance from the pivot axis A-A' of the handle lever 110.

That is, the rotation direction of the handle lever 110 around the pivot axis A-A' and the vertical surface 125b of the lock protrusion 125 are not perpendicular to each other, but have a predetermined angle therebetween.

In this structure, when a tension exceeding a predetermined magnitude is applied to the emergency release cable 170 through the automatic transmission after the engine and the automatic transmission are restarted in a state where the handle lever 110 is fixed to the second position P2, the handle lever 110 and the slider 120 receive a rotational force through the operation of the guide pin 150, the rotational force pivoting the handle lever 110 and the slider 120 in the clockwise direction around the pivot axis A-A' based on FIG. 8A.

At this time, since the lock protrusion 125 of the slider 120 and the finger part 142 of the spring finger 140 are engaged with each other at the second position P2 of the handle lever 110, the rotations of the handle lever 110 and the slider 120 are blocked. However, the entire stress Ft applied to the lock protrusion 125 is split into a first component force F1 perpendicular to the vertical surface 125b and a second component force F2 parallel to the vertical surface 125b by the angle between the vertical surface 125b of the lock protrusion 125 and the rotation direction of the handle lever 110.

Thus, the slider 120 receives the second component force F2 working on the vertical surface 125b of the lock protrusion 125. When the second component force F2 equal to or more than a predetermined magnitude is applied, the third hook part 124 of the slider 120 is separated from the lock hole 115a-1 of the handle lever 110, and the slider 120 is linearly moved in a direction away from the pivot axis A-A' of the handle lever 110, while being moved along the stopper protrusion 142b of the finger part 142 formed in parallel to the vertical surface 125b of the lock protrusion 125.

When the slider 120 is linearly moved in the direction away from the pivot axis A-A' of the handle lever 110, the engagement between the lock protrusion 125 and the finger part 142 is automatically released, and the handle lever 110 part 142 returns to the first position P1 from the second position P2.

However, although the second component force F2 is applied, the third hook part 124 of the slider 120 may not be automatically separated from the lock hole 115a-1 of the handle lever 110.

In order to provide against such a case, the lever body 111 of the handle lever 110 has a manual release groove 117 communicating with the guide groove part 113 of the handle lever 110, such that a driver or passenger manually pushes the slider 120 to separate the third hook part 124 of the slider 120 from the lock hole 115a-1 of the handle lever 110.

The spring finger 140 is fixed to the lever bracket 130, and engaged with the lock protrusion 125 of the slider 120 so as to block the handle lever 110 from returning to the first position P1 from the second position P2.

The spring finger 140 may be integrated with the lever bracket 130 or formed separately from the lever bracket 130 and coupled and fixed to the outer surface of any one of the first and second sidewalls 132 and 133 of the lever bracket 130.

Figure 10:
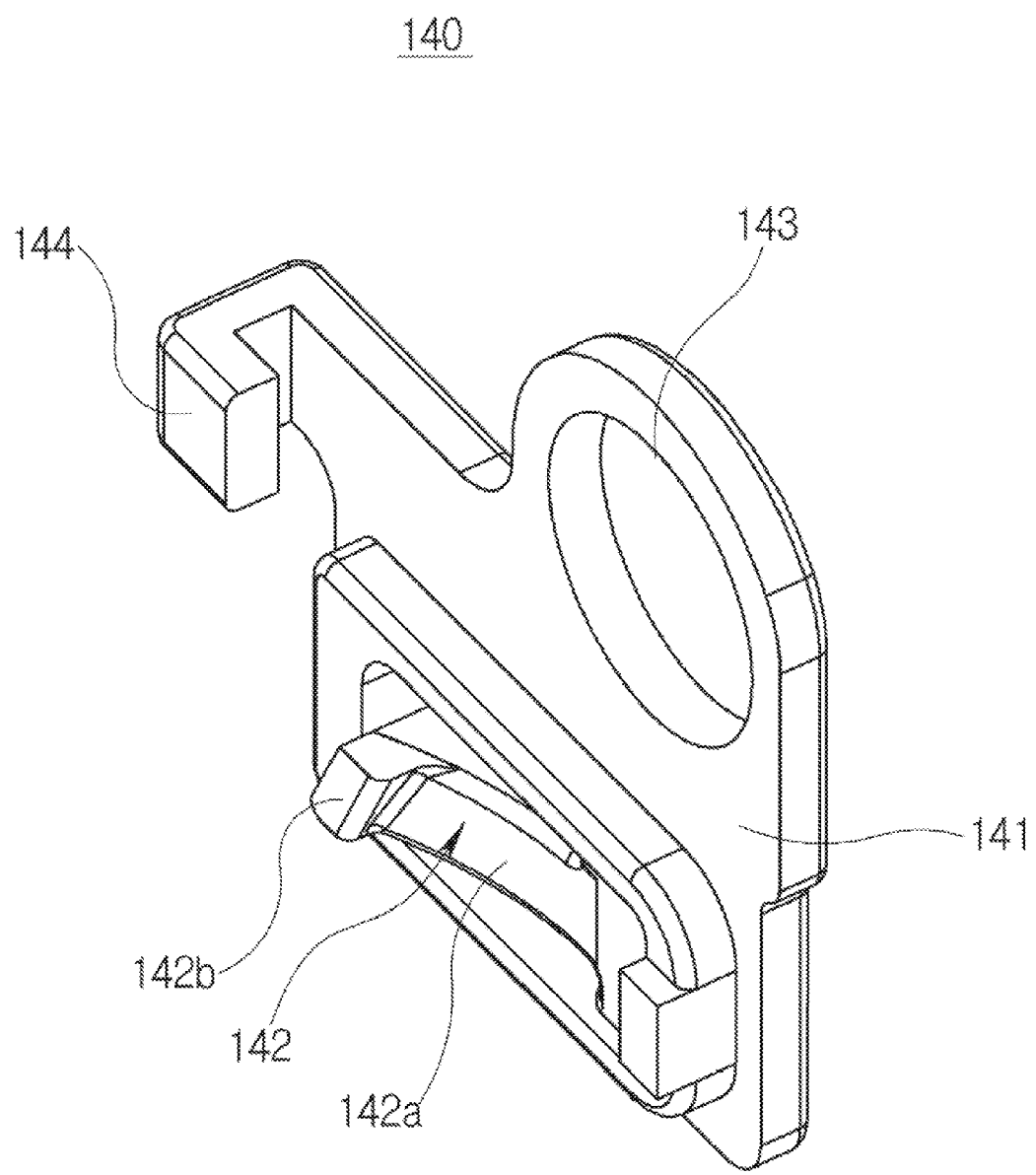
FIG. 10 is a rear perspective view of FIG. 9.

FIGS. 9 and 10 illustrate that the spring finger 140 is separately formed and coupled to the lever bracket 130. The present invention is not limited thereto, but the following descriptions will be focused on the embodiment in which the spring finger 140 is formed separately from the lever bracket 130 and fixed to the second sidewall 133 of the lever bracket 130.

As illustrated in FIGS. 9 and 10, the spring finger 140 includes a plate-shaped member 141 and a hook-shaped finger part 142. The plate-shaped member 141 has a fixing hole 143 through which the guide pin 150 is passed, and is attached and fixed to the outer surface of the second sidewall 133 of the lever bracket 130. The hook-shaped finger part 142 includes a support rod 142a of which one end serves as a fixed end connected to the plate-shaped member 141 and the other end serves as a free end, and a stopper protrusion 142b which protrudes toward the housing space from the other end of the support rod 142a.

As the finger part 142 is formed with a hook structure, the stopper protrusion 142b of the finger part 142 slides over the inclined surface 125a of the lock protrusion 125 when the handle lever 110 is pivoted from the first position P1 to the second position P2. When the vertical surface 125b of the lock protrusion 125 comes in contact with the stopper protrusion 142b of the finger part 142, the handle lever 110 can be effectively blocked from pivoting in the opposite direction.

The second sidewall 133 of the lever bracket 130 has a finger guide groove 135 formed on the outer surface thereof. The finger guide groove 135 is formed in a shape corresponding to the plate-shaped member 141 so as to house the spring finger 140, and has a finger hole 135a through which the stopper protrusion 142b of the finger part 142 is passed.

The spring finger 140 may further include a fastening leg 144 integrated with the plate-shaped member. The fastening leg 144 reliably fixes the spring finger 140 after the spring finger 140 is coupled to the finger guide groove of the lever bracket 130, and prevents the spring finger 140 from being separated from the lever bracket 130.

FIGS. 9 and 10 illustrate an embodiment including the U-shaped fastening leg 144 having a width corresponding to the second sidewall 133. As illustrated in FIG. 2, the spring finger 140 may be coupled to the lever bracket 130 while the edge of the second sidewall 133 is inserted into the U-shaped fastening leg 144.

Hereafter, referring to FIGS. 11 to 15, the operation of the operating apparatus 100 for an emergency release cable according to the embodiment of the present invention will be described.

Figure 11:
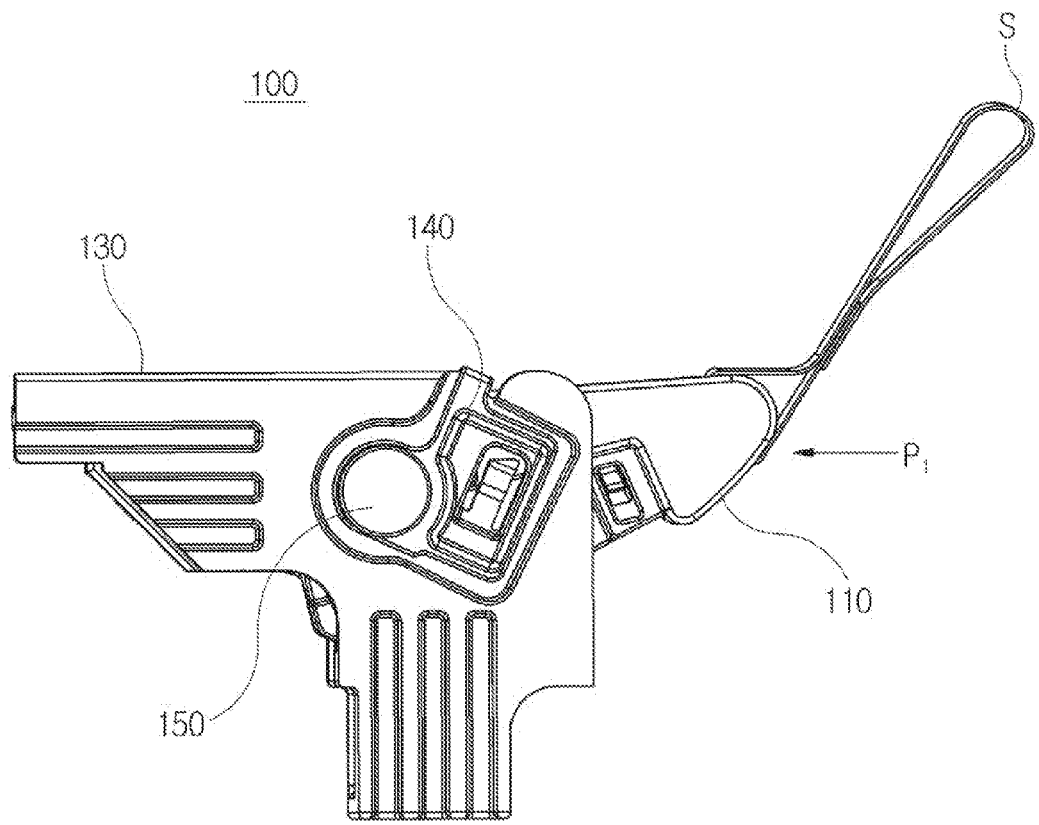
FIG. 11 is a diagram illustrating a state before the handle lever is pivoted from a first position to a second position.

FIG. 11 illustrates a state in which the handle lever 110 is placed at the first position P1 which is the initial position before the handle lever 110 is pivoted, and the transmission is set at the parking position.

When a fail occurs in the TCU in a state where the handle lever 110 is placed at the first position P1, the engine and the transmission may be stopped. In this case, a driver or passenger pivots the handle lever 110 toward the second position P2 (the counterclockwise direction based on FIG. 11), in order to manually switch the transmission to the neutral position from the parking position.

Figure 12:
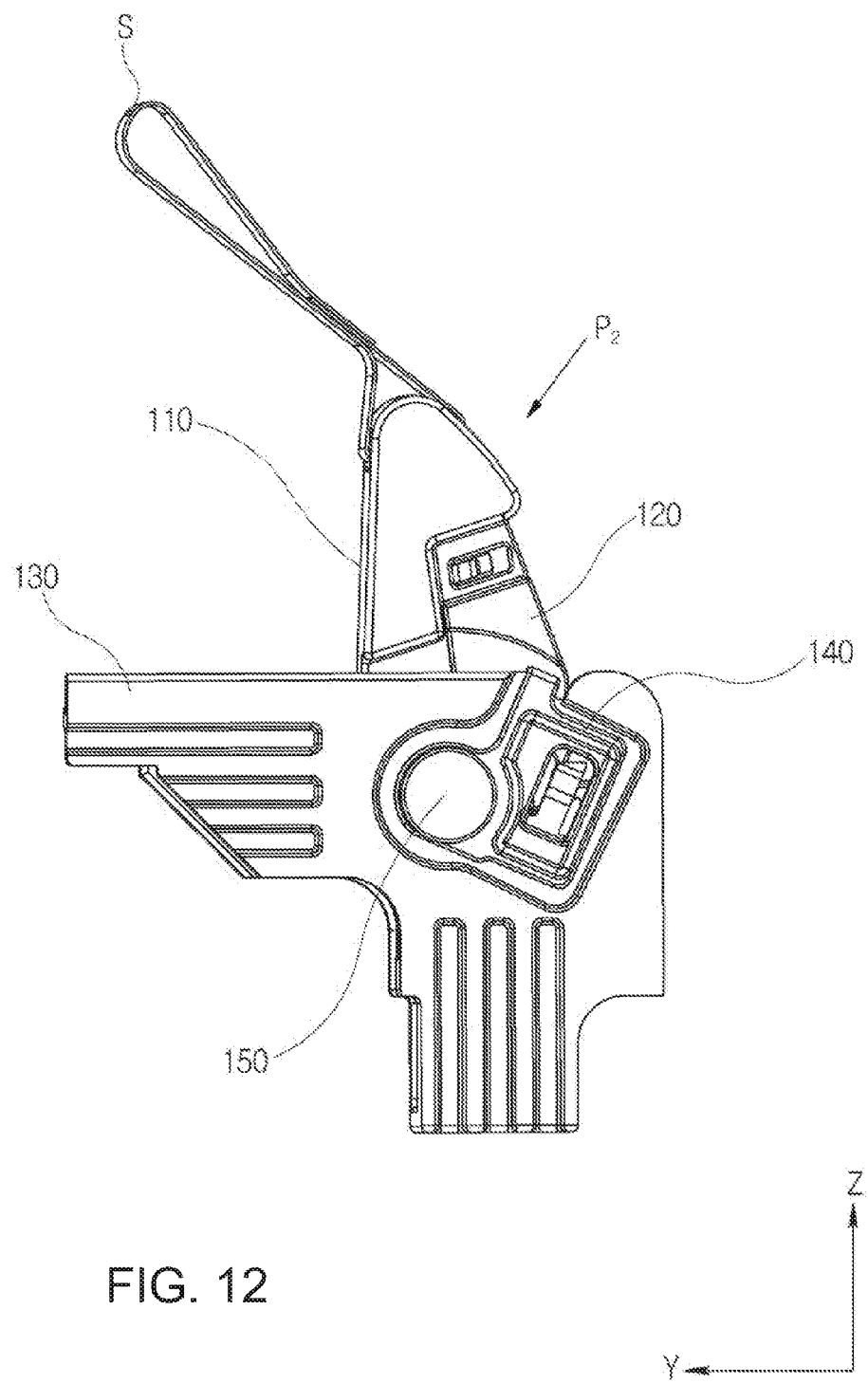
FIG. 12 is a diagram illustrating a state in which the handle lever is completely pivoted to the second position.

When the handle lever 110 is completely pivoted, the handle lever 110 is fixed at the second position P2 illustrated in FIG. 12, and the neutral position of the transmission is maintained.

Figure 13:
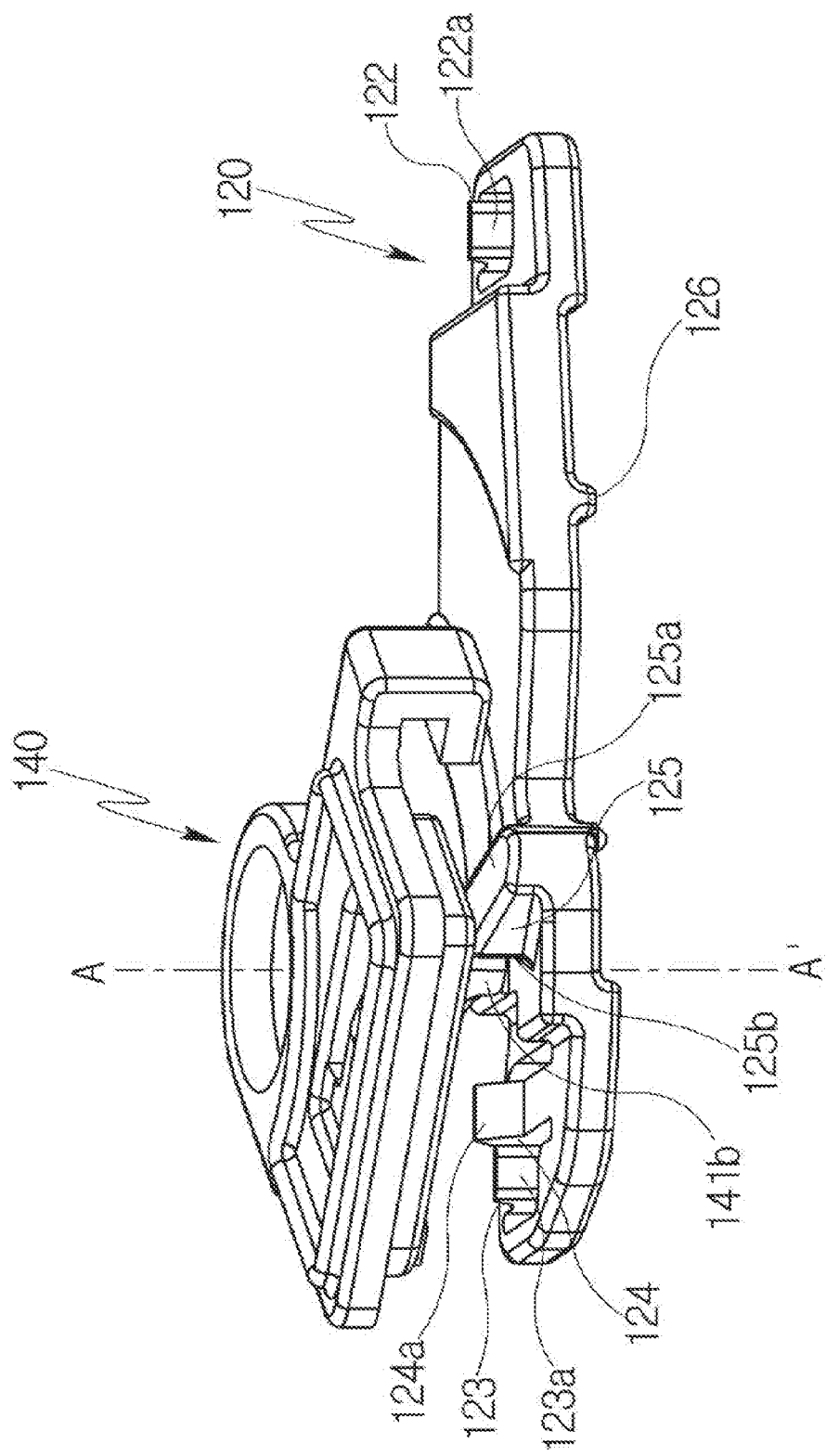
FIGS. 13 and 14 are exploded perspective views for describing the operation relation between the slider and the spring finger among components of the operating apparatus for an emergency release cable according to the embodiment of the present invention.

In this case, as illustrated in FIG. 13, the vertical surface 125b of the lock protrusion 125 of the slider 120 and the stopper protrusion 142b of the spring finger 140 are engaged to block the handle lever 110 from returning to the first position P1.

Then, when the function of the TCU in which the fail occurred is recovered to restart the engine and the transmission, a tension works on the emergency release cable 170 connected to the transmission.

The tension of the emergency release cable 170 provides a rotational force to automatically return the handle lever 110 to the first position P1 from the second position P2. Simultaneously, the vertical surface 125b of the lock protrusion 125 of the slider 120 receives the second component force F2 in a direction away from the pivot axis A-A' of the handle lever 110.

When the tension of the emergency release cable 170 exceeds a predetermined magnitude or the second component force F2 has a magnitude enough to elastically deform the third hook part 124 of the slider 120, the third hook part 124 starts to be separated from the lock hole 115a-1 of the handle lever 110, and the engagement between the lock protrusion 125 of the slider 120 and the stopper protrusion 142b of the spring finger 140 is easily released without causing abrasion therebetween.

As soon as the engagement between the lock protrusion 125 of the slider 120 and the stopper protrusion 142b of the spring finger 140 is released through the above-described mechanism, the handle lever 110 can be automatically returned to the first position P1 of FIG. 11 from the second position P2 of FIG. 12.

Figure 14:
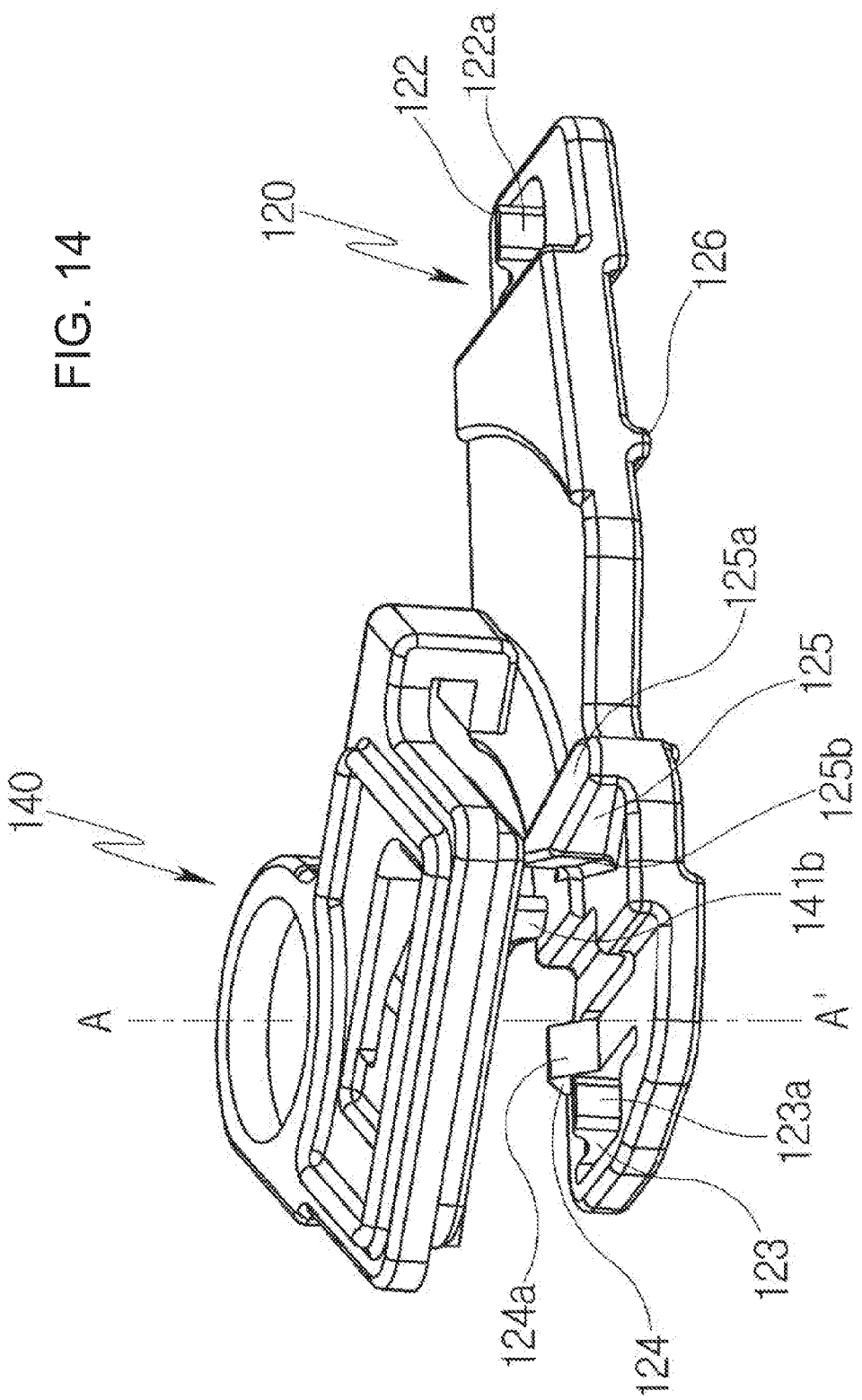
Figure 15:
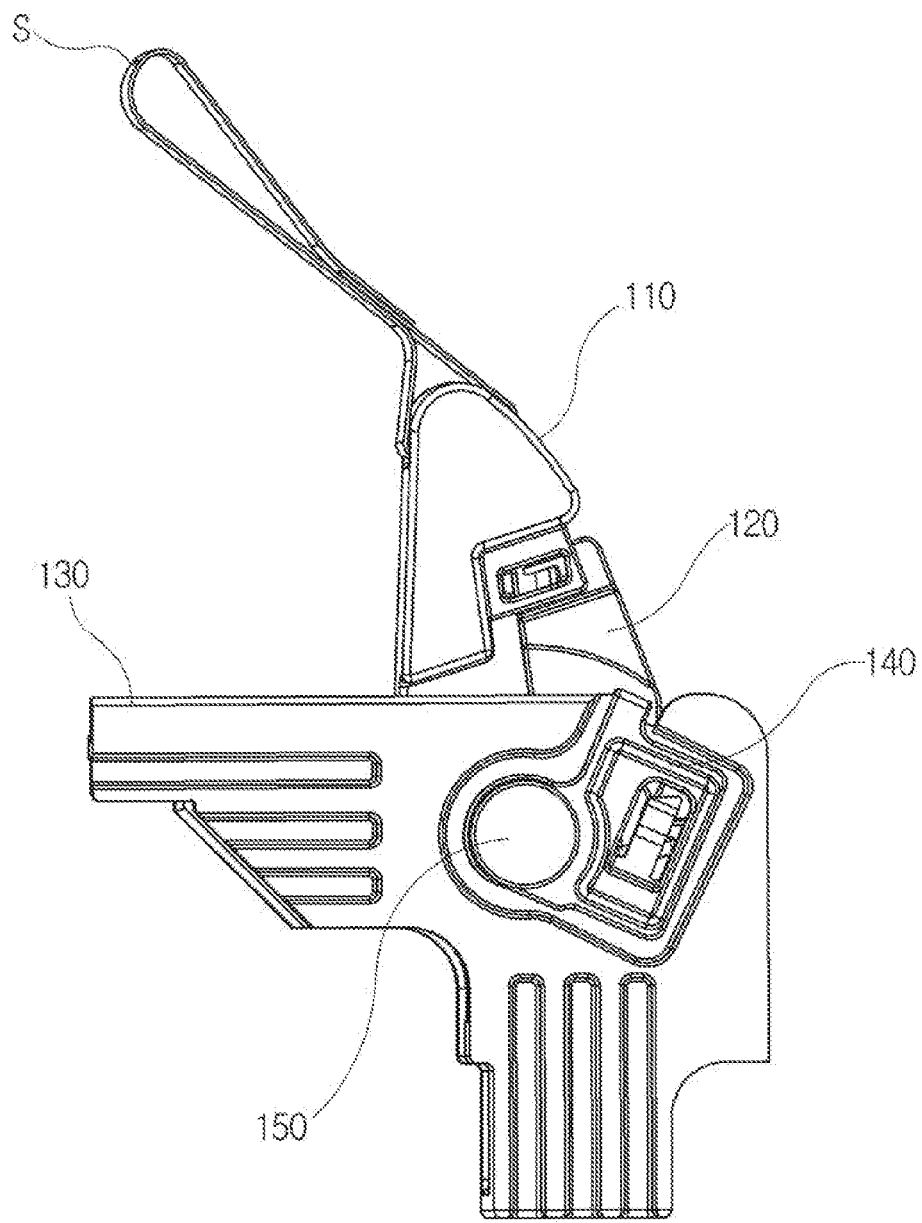
FIG. 15 is a diagram illustrating a state before the handle lever starts to be pivoted from the second position to the first position.

FIGS. 14 and 15 illustrate a state in which the engagement between the lock protrusion 125 of the slider 120 and the stopper protrusion 142b of the spring finger 140 is released by the tension of the emergency release cable. In this state, the slider 120 is linearly moved on the handle lever 110 in a direction away from the pivot axis A-A' such that no overlapping part exists between the lock protrusion 125 and the stopper protrusion 142b in the radial direction based on the pivot axis A-A'.

As illustrated in FIGS. 14 and 15, when the slider 120 is moved in the direction away from the pivot axis A-A', the lock protrusion 125 of the slider 120 and the stopper protrusion 142b of the spring finger 140 cannot be engaged with each other.

Thus, the slider 120 needs to be pushed to the initial position such that the lock protrusion 125 and the stopper protrusion 142b can be engaged with each other.

For this operation, one or more of the first and second sidewalls 132 and 133 of the lever bracket 130 for the emergency release cable 170 according to the embodiment of the present invention may have a pressurizing protrusion 134 which protrudes toward the housing space, and collides with the slider 120 when the handle lever 110 is pivoted from the second position P2 to the first position P1.

Figure 16:
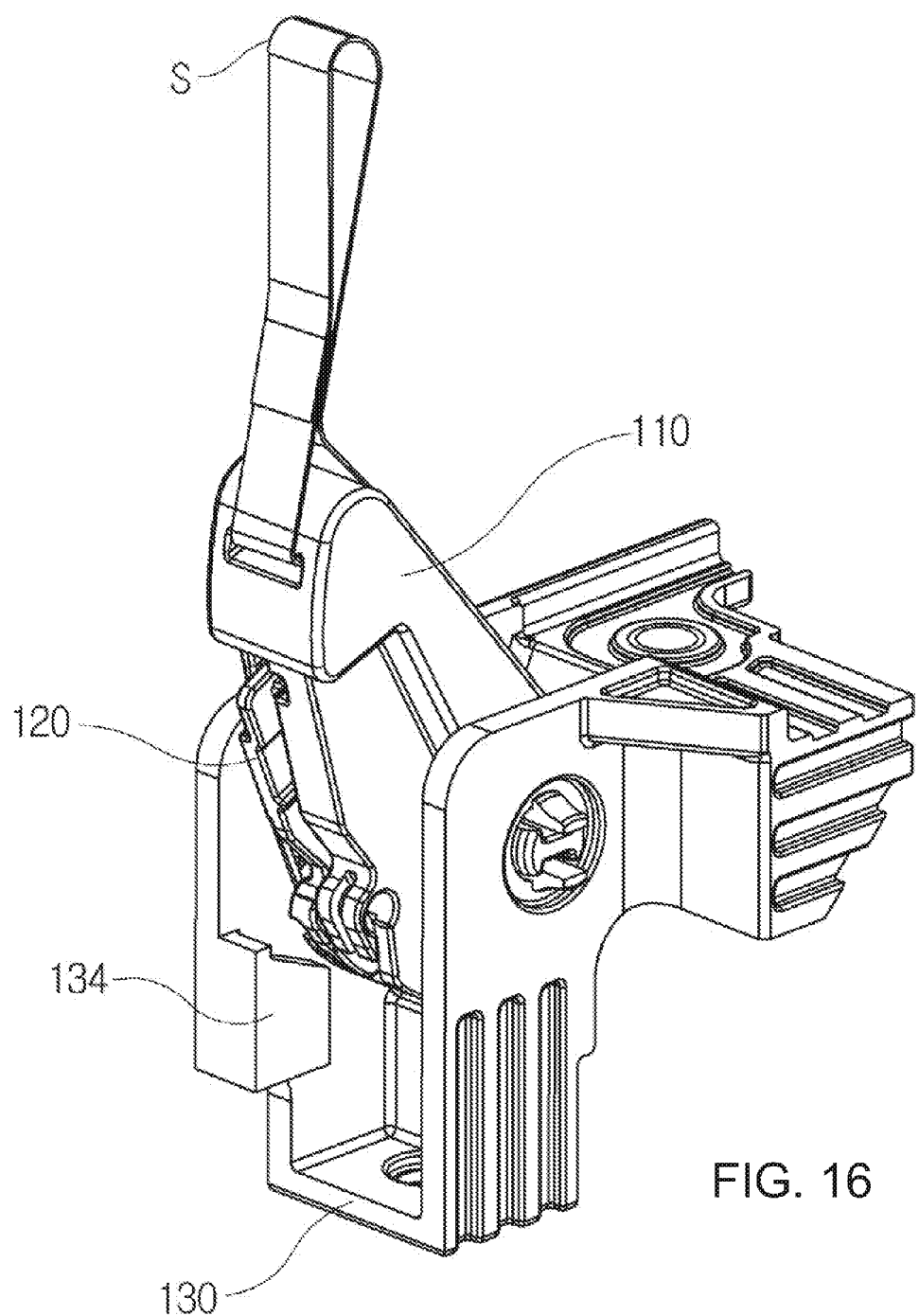
FIG. 16 is a perspective diagram for describing the operation of the slider and a pressurizing protrusion while the handle lever is pivoted from the second position to the first position.

The present invention is not limited thereto, but FIG. 16 illustrates that the pressurizing protrusion 134 protrudes toward the housing space formed in the upper end part of the second sidewall 133.

The pressurizing protrusion 134 pressurizes and fixes the slider 120 to the initial position before the handle lever 110 is completely pivoted to the first position P, such that the lock protrusion 125 of the slider 120 and the stopper protrusion 142b of the spring finger 140 can be engaged with each other.

According to the embodiments of the present invention, the operating apparatus for an emergency release cable can prevent abrasion of the fixing structure of the emergency release lever connected to the emergency release cable, and prevent malfunctions in the related arts, thereby improving the durability and reliability.

Furthermore, the operating apparatus can switch a transmission to the parking position while the fixing structure of the emergency release lever is automatically released when the engine and the transmission are restarted, thereby improving the convenience of a driver and a passenger.

While the present invention has been described with respect to the specific embodiments, it will be apparent to those skilled in the art that various changes and modifications may be made without departing from the spirit and scope of the invention as defined in the following claims.

What is claimed is:

1. An operating apparatus for an emergency release cable, which enables a user to manually switch an automatic transmission from a parking position to a neutral position using the emergency release cable, the operating apparatus comprising:
    a lever bracket fixed to a position adjacent to a driver's seat;
    a handle lever installed in the lever bracket so as to pivot around a pivot axis from a first position to a second position, wherein an end of the emergency release cable is fixed to the handle lever;
    a slider having a lock protrusion for fixing the handle lever to the second position, and linearly-movably coupled to the handle lever;
    a spring finger fixed to the lever bracket, and engaged with the lock protrusion so as to block the handle lever from returning to the first position from the second position; and
    a guide pin preventing the handle lever from being separated from the lever bracket, and pivotably supporting the handle lever,
    wherein when the handle lever is pivoted from the first position to the second position, the emergency release cable is pulled to switch the automatic transmission from the parking position to the neutral position, when the handle lever is pivoted to the second position, the lock protrusion and the spring finger are engaged to fix the handle lever to the second position, and when a tension exceeding a predetermined magnitude is applied to the emergency release cable after the handle lever is fixed to the second position, the engagement between the lock protrusion and the spring finger is released while the slider is linearly moved in a direction away from the pivot axis.

2. The operating apparatus according to claim 1, wherein the slider comprises:
a flat body part having a first surface contacted with the handle lever;
a first hook part protruding from a first end of a second surface of the flat body part; and
a second hook part protruding from a second end of the second surface of the flat body part, and
the lock protrusion protrudes from the second surface of the flat body part, and is formed between the first and second hook parts.

3. The operating apparatus according to claim 2, wherein the lock protrusion comprises:
an inclined surface coming in contact with the spring finger, when the handle lever is pivoted from the first position to the second position; and
a vertical surface engaged with the spring finger when the handle lever is completely pivoted, and blocking the handle lever from returning from the second position to the first position.

4. The operating apparatus according to claim 3, wherein a projected straight extension line formed when the vertical surface crosses a plane perpendicular to the pivot axis is spaced at a predetermined distance from the pivot axis.

5. The operating apparatus according to claim 3, wherein the handle lever comprises:
a lever body having a pivot hole through which the guide pin is passed and a guide groove part formed on one surface thereof, the guide groove part guiding a linear reciprocation of the slider;
a first guide wall spaced at a distance from a first surface of the guide groove part, the distance corresponding to a thickness of the first end of the flat body part, and having a first guide hole into which the first hook part is inserted; and
a second guide wall spaced at a distance from the first surface of the guide groove part, the distance corresponding to a thickness of the second end of the flat body part, and having a second guide hole into which the second hook part is inserted, and
the linear reciprocation of the slider is guided through the movement of the first hook part in the first guide hole and the movement of the second hook part in the second guide hole.

6. The operating apparatus according to claim 5, wherein the slider has one or more ribs formed on the first surface thereof, the one or more ribs coming in contact with the bottom surface of the guide groove part.

7. The operating apparatus according to claim 5, wherein the slider further comprises a third hook part preventing the movement of the slider so as to maintain the engagement between the lock protrusion and the spring finger, and
the handle lever further comprises a lock hole into which the third hook part is inserted and fixed.

8. The operating apparatus according to claim 7, wherein the third hook part is formed at a position adjacent to the second hook part, and
the lock hole is integrated with the second guide hole.

9. The operating apparatus according to claim 8, wherein the third hook part has a third stopper surface which is inserted into the lock hole to block the movement of the slider, and
the third stopper surface has an inclination angle which increases in a direction away from the lock hole.

10. The operating apparatus according to claim 7, wherein when the tension exceeding the predetermined magnitude is applied to the emergency release cable, the third hook part is separated from the lock hole, and the engagement between the lock protrusion and the spring finger is released.

11. The operating apparatus according to claim 5, wherein the bottom surface of the guide groove part has a coupling groove formed at a position corresponding to the first hook part, and the coupling groove is formed along a direction of the linear reciprocation of the slider.

12. The operating apparatus according to claim 5, wherein the lever body of the handle lever has a manual release groove which communicates with the guide groove part, in order to manually release the engagement between the lock protrusion and the spring finger.

13. The operating apparatus according to claim 5, wherein the lever bracket comprises:
a bracket body having a fastening hole;
a first sidewall extended from the bracket body, and having a first through-hole through which the guide pin is passed; and
a second sidewall extended from the bracket body in a direction parallel to the first sidewall, and having a second through-hole through which the guide pin is passed, and
the handle lever is housed to pivot from the first position to the second position in a housing space between the first and second sidewalls in a state where the handle lever and the slider are coupled to each other.

14. The operating apparatus according to claim 13, wherein at least one of the first and second sidewalls has a pressurizing protrusion which protrudes toward the housing space, and collides with the slider when the handle lever is pivoted from the second position to the first position.

15. The operating apparatus according to claim 13, wherein the spring finger is integrated with the lever bracket.

16. The operating apparatus according to claim 13, wherein the spring finger is formed separately from the lever bracket, and coupled and fixed to the lever bracket.

17. The operating apparatus according to claim 16, wherein the spring finger comprises:
a plate member having a fixing hole through which the guide pin is passed, and attached and fixed to an outer surface of any one of the first and second sidewalls; and
a finger part comprising a support rod of which a first end serves as a fixed end connected to the plate member and a second end serves as a free end, and a stopper protrusion which protrudes from the second end of the support rod toward the housing space.

18. The operating apparatus according to claim 17, wherein the spring finger further comprises a fastening leg which is integrated with the plate member so as to be fastened to the outer surface of any one of the first and second sidewalls.

19. The operating apparatus according to claim 17, wherein the outer surface of any one of the first and second sidewalls has a finger guide groove corresponding to the shape of the plate member, and the finger guide groove has a finger hole through which the stopper protrusion is passed.

20. The operating apparatus according to claim 13, further comprising a protection ring formed of a metallic material and inserted and fixed to the fastening hole.

* * * * *